United States Patent [19]
Sanders et al.

[11] Patent Number: 5,599,026
[45] Date of Patent: Feb. 4, 1997

[54] TURBINE SEAL WITH SEALING STRIP AND RUBBING STRIP

[75] Inventors: William P. Sanders, Aurora, Canada; Anthony F. Mitola, Clifton Park, N.Y.

[73] Assignee: Innovative Technology, L.L.C., Clifton Park, N.Y.

[21] Appl. No.: 524,258

[22] Filed: Sep. 6, 1995

[51] Int. Cl.⁶ .......................... F16J 15/447; F16J 15/453
[52] U.S. Cl. .......................... 277/53; 277/55; 415/174.4; 415/174.5
[58] Field of Search ...................... 277/53, 54, 55; 415/173.4, 173.5, 174.4, 174.5

[56] References Cited

U.S. PATENT DOCUMENTS

| | | | |
|---|---|---|---|
| 815,973 | 3/1906 | McKee . | |
| 1,747,253 | 2/1930 | Leroy . | |
| 1,848,613 | 3/1932 | Flanders . | |
| 2,458,988 | 1/1949 | Gayer . | |
| 3,503,616 | 3/1970 | Hickey | 277/53 |
| 3,897,169 | 7/1975 | Fowler . | |
| 4,057,362 | 11/1977 | Schwaebel | 277/53 |
| 4,420,161 | 12/1983 | Miller . | |
| 4,436,311 | 3/1984 | Brandon | 277/53 |
| 5,029,876 | 7/1991 | Orlando et al. . | |
| 5,080,556 | 1/1992 | Carreno . | |
| 5,351,971 | 10/1994 | Short | 277/53 |

FOREIGN PATENT DOCUMENTS

| | | | |
|---|---|---|---|
| 108602 | 9/1927 | Austria . | |
| 453315 | 10/1991 | European Pat. Off. | 277/53 |
| 285857 | 6/1929 | United Kingdom | 277/53 |
| 651921 | 4/1951 | United Kingdom | 277/53 |
| 1224234 | 3/1971 | United Kingdom . | |

OTHER PUBLICATIONS

Sanders, W. P., "Turbine Steam Path Engineering for Operations and Maintenance Staff," 1988, pp. 4.1–4.20, Chapter 11, and p. 13.30.

*Primary Examiner*—Scott Cummings
*Attorney, Agent, or Firm*—Heslin & Rothenberg, P.C.

[57] ABSTRACT

A rubbing strip is used in conjunction with the sealing strips of a seal to prevent contact between the sealing strips and a rotating member with which the sealing strips form a seal. The rubbing strip comprises a strip of material which is oriented coaxially with the sealing strips and which has a clearance with respect to the rotating member which is less than the least of the clearances provided by the sealing strips with which it is associated. The material and the cross-sectional shape of the rubbing strip may be selected in accordance with desired wear properties. The rubbing strip may be formed integrally with a sealing ring, or may be formed to be inserted into a complementary receiving recess on a sealing ring.

34 Claims, 7 Drawing Sheets

TURBINE SEAL WITH SEALING STRIP AND RUBBING STRIP

FIELD OF THE INVENTION

The invention pertains to devices for providing seals to constrict fluid flow between a stationary member and a rotating member in a mechanical apparatus such as a turbine.

BACKGROUND OF THE INVENTION

The turbine is a well known apparatus which is characterized by a rotating member which turns in response to an applied force. Typically this force is generated by passing a high pressure fluid such as steam over a series of blades which are connected to the rotating member. The efficiency of a turbine depends on its ability to use as much of this applied force as possible to maintain rotation. Sealing devices maintain turbine efficiency by preventing steam from escaping from the working space of the turbine and by preventing air from leaking into the working space of the turbine.

Figure 1:
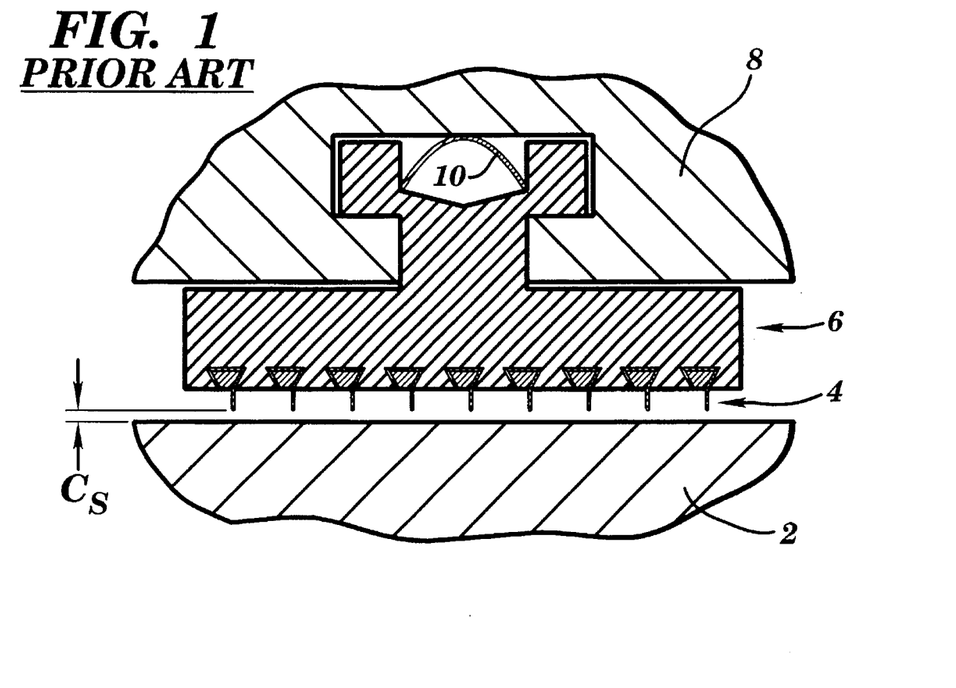
FIG. 1 depicts, in cross section, a prior art steam seal oriented about a rotating member.

The sealing devices used on turbines are known variously as steam seals, gland seals, labyrinth seals, steam packings, diaphragm packings, and pressure packings. A typical steam seal is shown in cross section in FIG. 1. In this illustration, a plurality of sealing strips 4 extend toward a rotor 2. The sealing strips 4 are preferably provided with a triangular or knife edge. The clearance between the sealing strips 4 and the rotor 2 is shown as the distance labeled $C_s$. The sealing strips 4 are supported by a ring 6. The ring 6 is mounted to a stationary portion 8 of the turbine. A spring 10 pushes the ring 6 inward toward the rotor 2 and allows for radial expansion of the ring away from the rotor. A seal such as this would be located, for example, near a point where the rotor emerges through an opening in the casing of the turbine. In operation, the sealing strips serve to contain most of the fluid that would otherwise escape through the space between the rotor and the stationary portion of the turbine which surrounds it.

Figure 2:
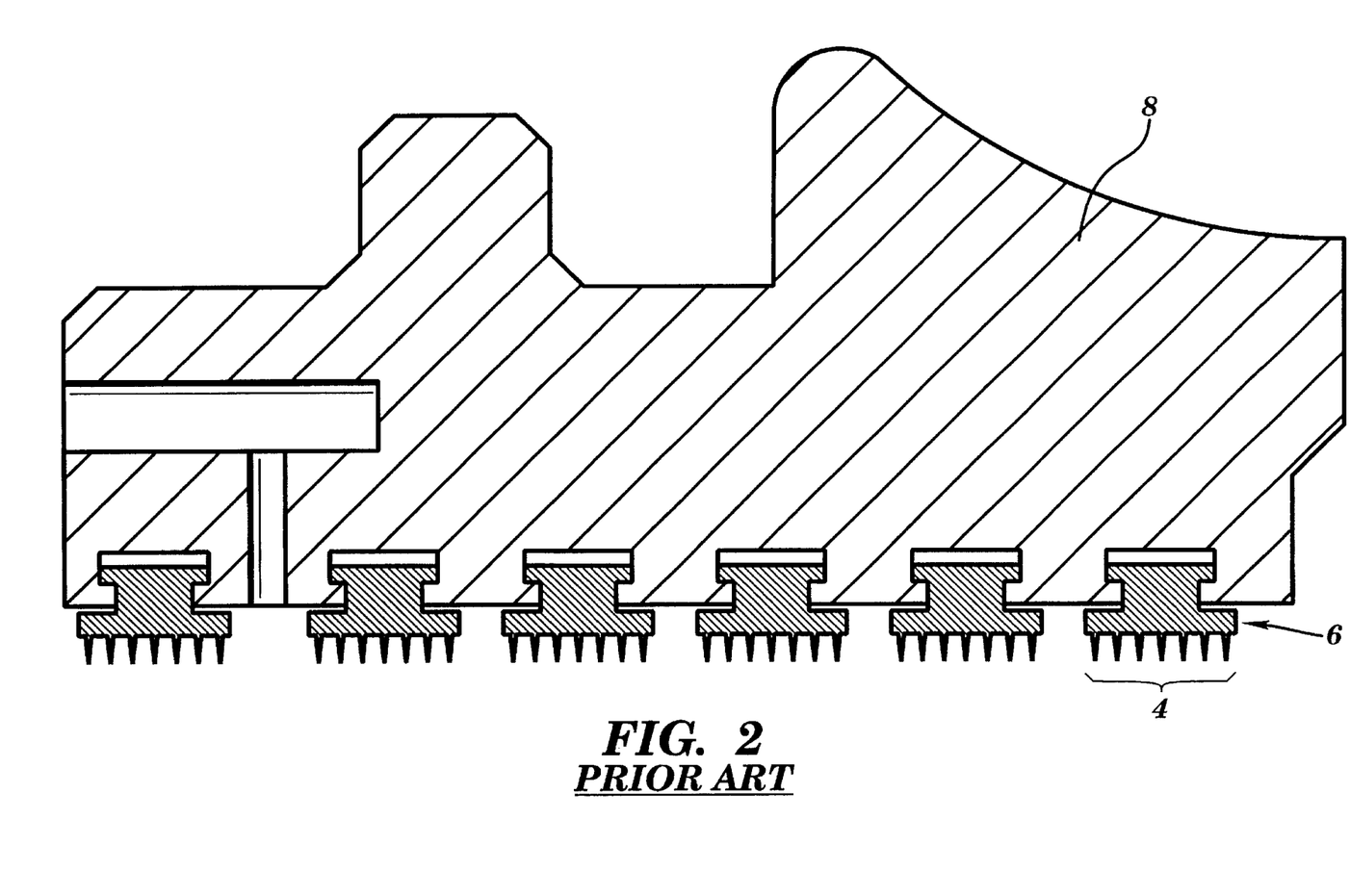
FIG. 2 depicts, in cross section, a prior art steam seal including a plurality of sealing rings.

In some applications it is typical to use several rings 6, each supporting several sealing strips 4. FIG. 2 shows a cross section of a stationary member 8 of a turbine to which are mounted several rings 6, each ring supporting several sealing strips 4.

Figure 3:
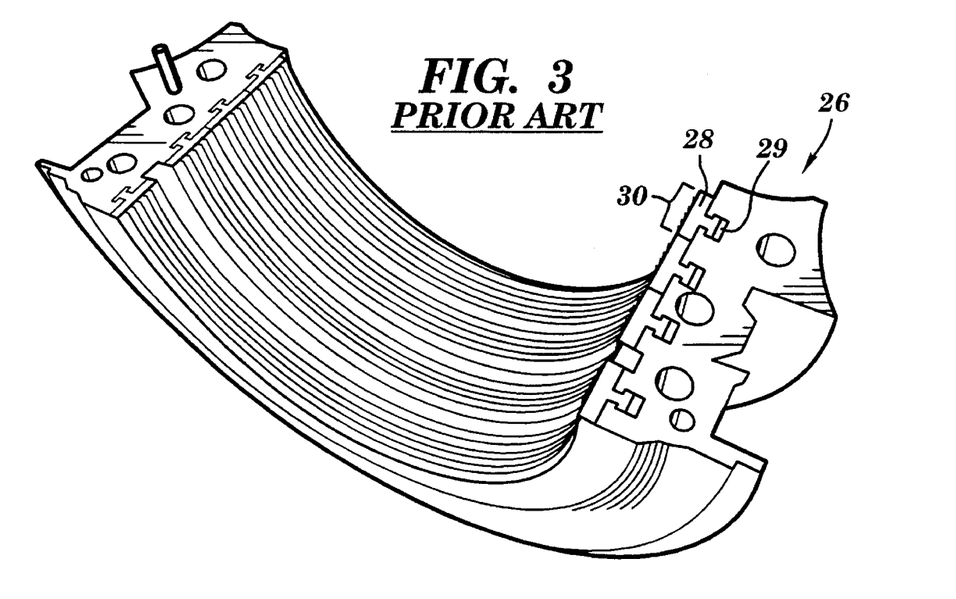
FIG. 3 depicts a section of a prior art packing head in which several sealing rings are mounted.

A perspective view of a section of a seal which would surround a rotor of a turbine is shown in FIG. 3. The seal includes a packing head 26 which in operation would be mounted to a stationary member of the turbine to partially encircle a rotating member of the turbine. Several ring segments 28 are mounted in slots 29 provided in the packing head. Each ring segment 28 supports several sealing strip segments 30. The illustrated section may be joined with a complimentary section to encircle and seal a rotating member of a turbine.

Figure 4:
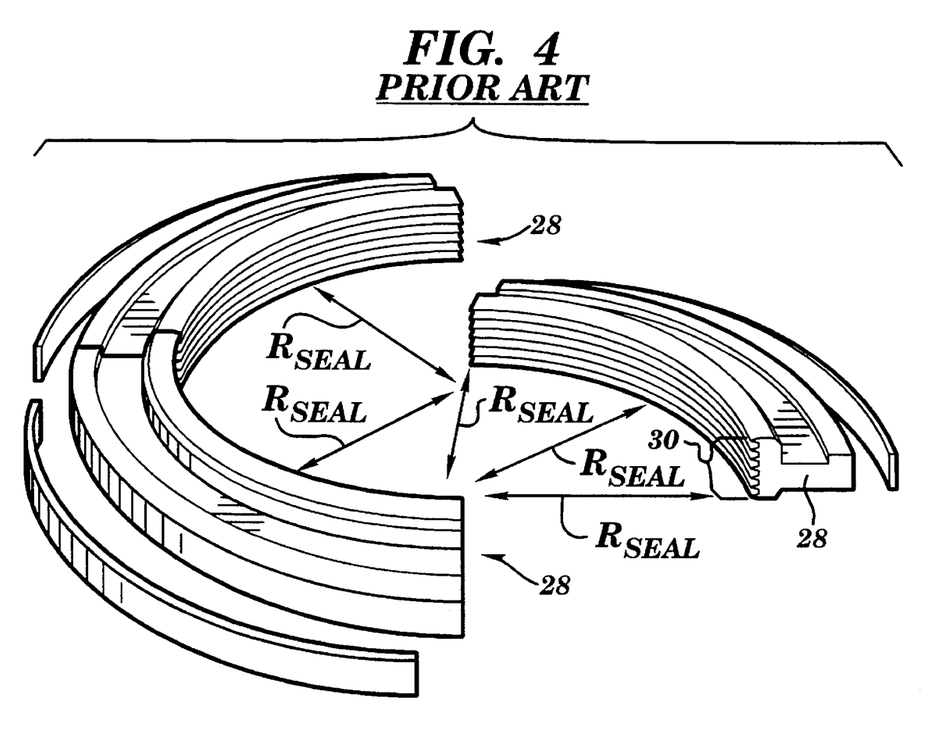
FIG. 4 depicts prior art sealing ring segments.

FIG. 4 illustrates several ring segments 28 which would be used in a packing head such as that illustrated in FIG. 3. Each ring segment supports several sealing strip segments 30. The sealing strip segments define an interior radius $R_{SEAL}$. This radius is chosen to correspond to a portion of a rotating member of a turbine so as to provide a desired clearance when placed in a sealing arrangement with the rotating member.

Figure 5:
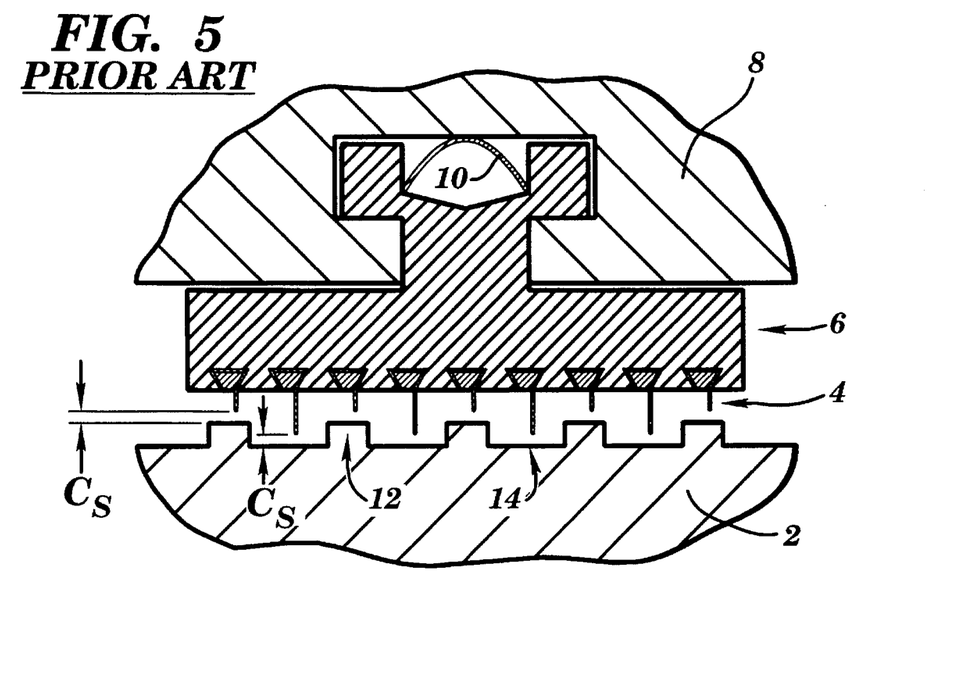
FIG. 5 depicts a cross section of a prior art steam seal oriented about a rotating member.

FIG. 5 shows a seal which is used with a rotating member 2 which has alternating high portions 12 and low portions 14 on its surface. The sealing strips 4 are chosen to define interior radii $R_{SEAL}$ such that a clearance $C_s$ is maintained at the tip of each sealing strip 4 between the sealing strip 4 and its corresponding portion of the rotor 2.

The effectiveness of steam seals depends significantly on maintaining a minimal clearance between the sealing strips and the rotating member. Contact between the sealing strips and the rotating member will wear the sealing strips, thereby increasing clearance and decreasing the efficiency of the seal. Contact is most likely to occur as a result of transient conditions, during which the rotating member may be displaced from its normal position relative to the seal. These conditions often coincide with the starting or stopping of the turbine, load rejections, or overspeeds. Transient conditions may cause the rotating member to rub against the seal, wearing the sealing strips and leaving rubs on the surface of the rotating member. It is therefore desirable to prevent contact between the rotating member and the sealing strips.

Additional useful background information may be found in Sanders, Turbine Steam Path Engineering for Operations & Maintenance Staff, 1988, the contents of which are incorporated herein by reference.

SUMMARY OF THE INVENTION

In a first aspect, the invention is embodied in the use of a rubbing strip in conjunction with the sealing strips of a seal to prevent contact between the sealing strips and a rotating member with which the sealing strips form a seal. The rubbing strip comprises a strip of material which is oriented coaxially with the sealing strips of the steam seal and which has a clearance with respect to the rotating member which is less than the least of the clearances provided by the sealing strips with which it is associated. In this configuration the rubbing strip will be the first component of the seal to make contact with the rotating member if conditions cause the rotating member to be displaced from its normal position relative to the seal. The material and the cross-sectional shape of the rubbing strip may be selected in accordance with desired wear properties. The rubbing strip may be formed integrally with a sealing ring, or may be formed to be inserted into complementary receiving means on a sealing ring.

In another aspect, the invention is embodied in a packing head for a turbine which incorporates a rubbing strip in the manner described above. The rubbing strip is located on a sealing ring which is supported by the packing head. The rubbing strip may be formed integrally with a sealing ring, or may be formed to be inserted into a slot on the sealing ring. The material and the cross-sectional shape of the rubbing strip may be selected in accordance with desired wear properties.

In another aspect, the invention is embodied in a ring segment for use in a seal. The ring segment includes one or more sealing strip segments and one or more rubbing strip segments. A plurality of such ring segments may be employed together to comprise a sealing ring. The rubbing strip segment is chosen to define an interior radius which provides a clearance with respect to a corresponding portion of a rotating member which is less than the least of the clearances provided by the sealing strip segments with which it is associated.

In another aspect, the invention is embodied in a rubbing strip segment for use in a ring segment of a steam seal. The rubbing strip segment is chosen to provide a clearance with respect to a corresponding portion of a rotating member which is less than the least of the clearances provided by the sealing strip segments with which it is associated.

Additional aspects of the invention are described in detail below.

BRIEF DESCRIPTION OF THE DRAWINGS

The invention may best be understood with reference to the following detailed description and drawings in which.

BEST MODE OF THE INVENTION

Figure 6:
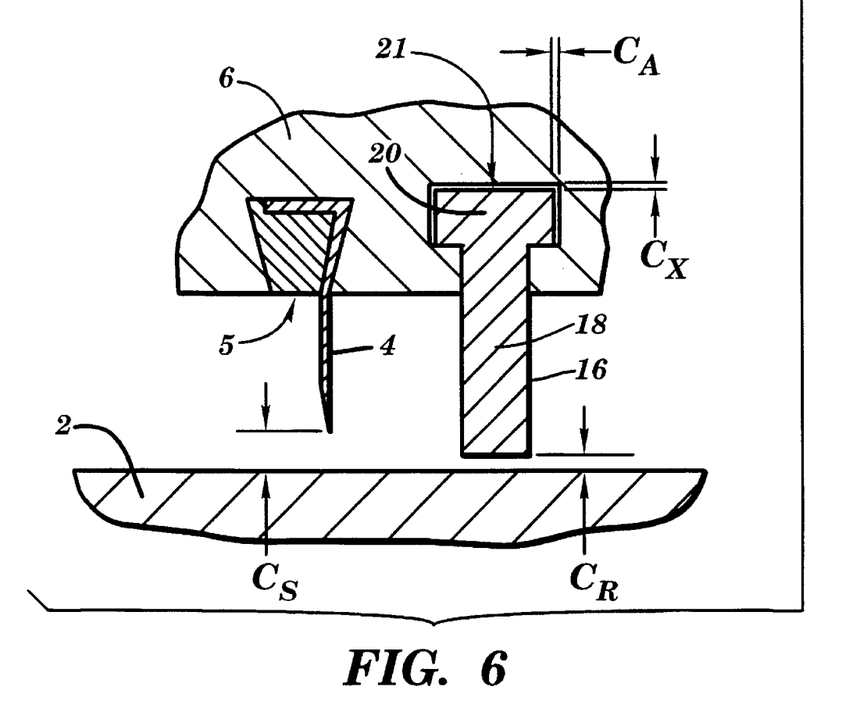
FIG. 6 depicts a rubbing strip and sealing strip in accordance with the present invention.

FIG. 6 illustrates in cross section a rubbing strip 16 employed in conjunction with a sealing strip 4 in accordance with the invention. The rubbing strip 16 is disposed adjacent to a sealing strip 4. The rubbing strip 16 and sealing strip 4 are supported by a ring 6 which is oriented about a rotating member 2. The sealing strip 4 is held in place by a caulking strip 5, while the rubbing strip is preferably held in place by means of a base portion 20 received by a complimentary slot 21 formed in the ring 6. The sealing strip has a clearance $C_s$ with respect to the rotating member, and the rubbing strip has a clearance $C_R$ with respect to the rotating member, $C_s$ being greater than $C_R$. It can be seen from this illustration that upon deflection of the rotating member 2 from its normal position relative to the rubbing strip 16 and sealing strip 4, the rotating member will make contact with the rubbing strip 16, thereby lifting the ring 6 away from the rotor rather than making contact with the sealing strip 4. The exact amount of clearance provided between the rubbing strip and the rotating member is preferably minimal, but is ultimately a matter of design choice. A clearance of 0.0020 to 0.0025 inches will provide satisfactory performance. However, one of ordinary skill in the art will recognize that it is undesirable to employ a rubbing strip clearance which would result in substantial or continuous contact with the rotating member.

The rubbing strips 16 of FIG. 6 and the remaining figures are illustrated as being comprised of a strip portion 18 having a rectangular cross section, and a base portion 20 having a rectangular cross section, the two portions forming a T-shaped cross section which is received by a complimentary rubbing strip slot 21. Such a rubbing strip may be easily inserted into a ring 6, and the end of the ring may be subsequently slightly deformed to hold the rubbing strip in place. It is preferable that such a rubbing strip be manufactured to allow clearances $C_A$ and $C_x$ to facilitate insertion and removal. While this cross sectional shape may be preferable for strength and ease of insertion and removal, it will be understood by those skilled in the art that other shapes may be equally employed, and that alternatively the rubbing strip may be formed integrally with the ring 6.

The material of the rubbing strip may be chosen to suit the particular needs of the application. Generally it is desirable to choose a material having superior wear characteristics which will not result in substantial damage to a rotating member during instances of contact. Such a material will generally have a coefficient of friction which is less than that of steel. Examples of such a material include carbon and chromium steel.

Figure 7:
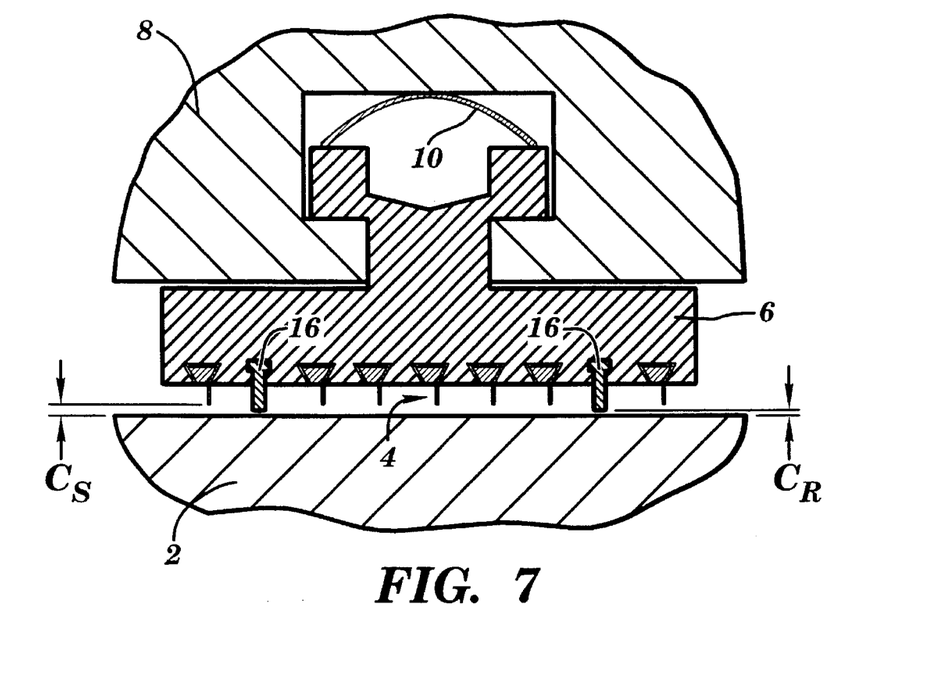
FIG. 7 depicts a cross section of a steam seal oriented about a rotating member and including rubbing strips in accordance with the present invention.

FIG. 7 illustrates in cross section a first embodiment of the invention in a steam seal. A ring 6 mounted to a packing head 8 supports a plurality of sealing strips 4. The ring encircles a rotating member 2 such as a rotor. Two rubbing strips 16 are preferably disposed substantially at respective edges of the ring 6. A spring 10 biases the ring 6 toward the rotor 2. The rubbing strips 16 have a clearance $C_R$ with respect to the rotor 2 which is less than the clearances $C_s$ of the sealing strips with respect to the rotor. It can be seen from this illustration that upon deflection of the rotating member 2 from its normal position relative to the rubbing strips 16 and sealing strips 4, the rotating member will make contact with the rubbing strips 16, thereby lifting the ring 6 away from the rotor rather than making contact with the sealing strips 4. It will be noted by those skilled in the art that various numbers of rubbing strips may be employed in a given ring, and that where a single rubbing strip is employed, it is preferable that the rubbing strip be substantially centered with respect to the spring.

Figure 8:
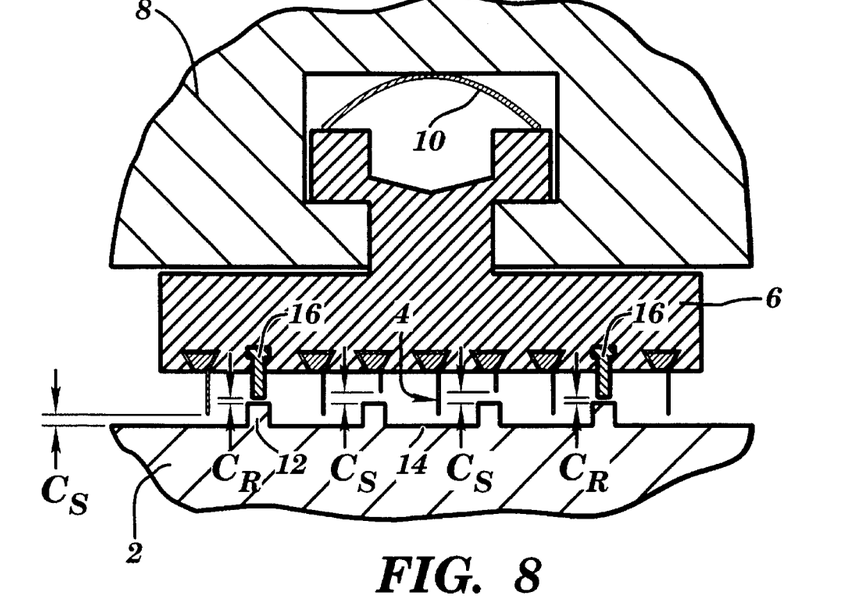
FIG. 8 depicts a cross section of a steam seal including rubbing strips in the "high" position in accordance with the invention.
Figure 9:
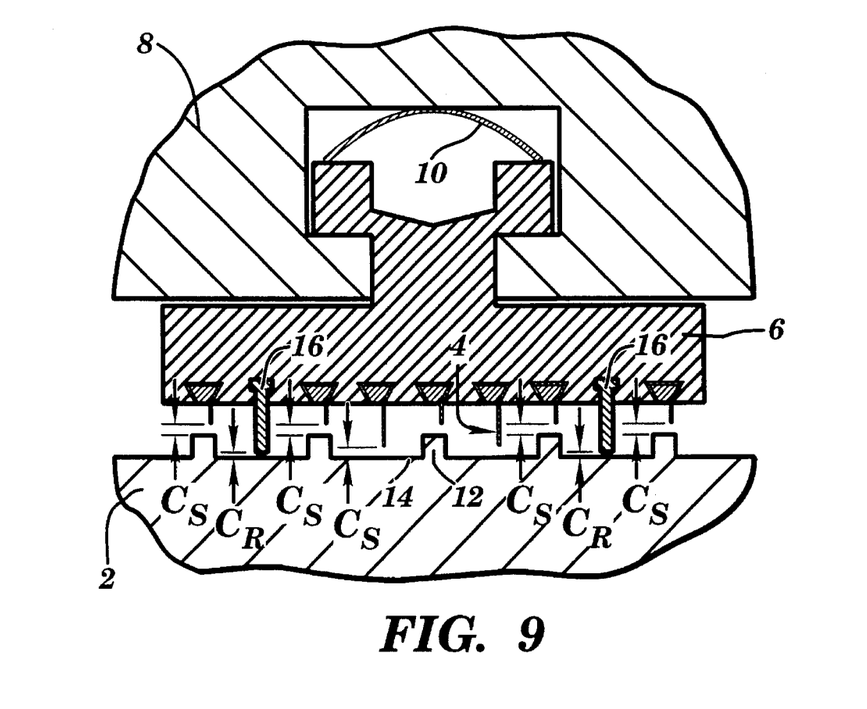
FIG. 9 depicts a cross section of a steam seal including rubbing strips in the "low" position in accordance with the invention.

FIG. 8 illustrates in cross section an alternative embodiment of the invention in a steam seal. A ring 6 mounted to a packing head 8 supports a plurality of sealing strips 4. The ring encircles a rotating member 2, such as a rotor, having one or more high portions 12 and one or more low portions 14. Some of the plurality of sealing strips 4 correspond to high portions of the rotor, and others of the plurality of sealing strips 4 correspond to low portions of the rotor. Two rubbing strips 16 are disposed substantially at respective edges of the ring 6 in positions which correspond to high portions 12 of the rotor 2. A spring 10 biases the ring 6 toward the rotor 2. The rubbing strips 16 have clearances $C_R$ with respect to their corresponding portions of the rotor 2 which are less than the clearances $C_s$ of the sealing strips 4 with respect to their corresponding portions of the rotor. It can be seen from this illustration that upon deflection of the rotating member 2 from its normal position relative to the rubbing strips 16 and sealing strips 4, the rotating member will make contact with the rubbing strip 16, thereby lifting the ring 6 away from the rotor rather than making contact with the sealing strips 4. A related alternative embodiment is shown in FIG. 9, in which the rubbing strips 16 correspond to low portions of the rotor 2. It will be apparent to one skilled in the art that the present invention may be adapted to function with any manner of rotating member by utilizing rubbing strips which provide the appropriate clearance with respect to the rotating member.

Figure 10:
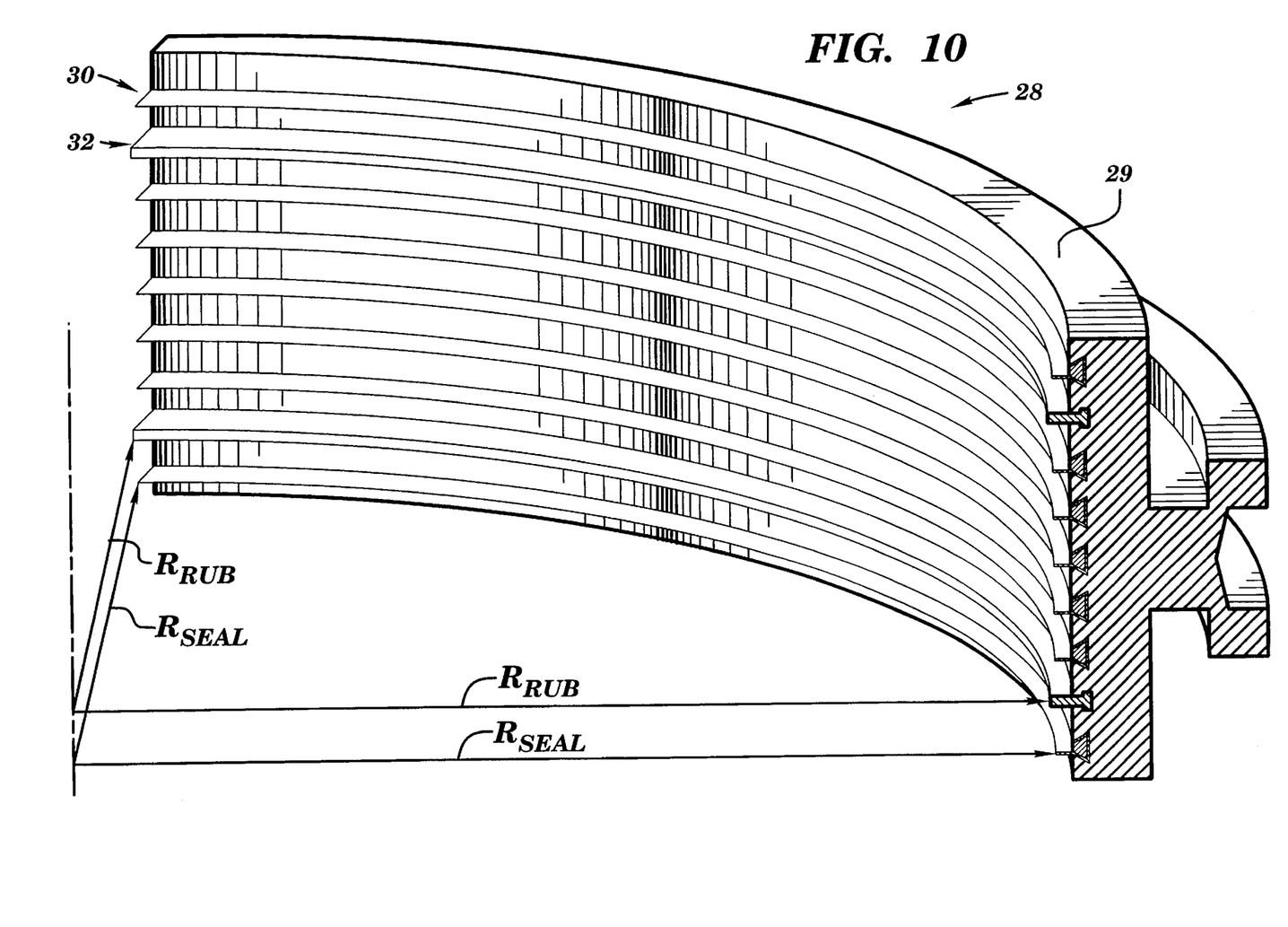
FIG. 10 depicts a ring segment comprising sealing strip segments and rubbing strip segments in accordance with the invention.

With respect to each of the embodiments described above, it will be apparent to those skilled in the art that the illustrated rings 6 may be formed from ring segments 28 in the manner illustrated in FIG. 4. FIG. 10 illustrates a ring segment 28 having a base portion 29 which supports several sealing strip segments 30 and two rubbing strip segments 32. The rubbing strip segments 32 and sealing strip segments 30 have respective interior radii $R_{RUB}$ and $R_{SEAL}$ which provide desired clearances with respect to their corresponding portion of a rotating member (not shown). The interior radii of the rubbing strip segments 32 are chosen to provide a clearance which is less than the least of the clearances of the sealing strip segments 30. The ring segment 28 may include a spring (not shown) for biasing the ring segment radially inward when mounted to a stationary member of a turbine. The rubbing strip segments may be formed integrally with the ring segment, or they may be supported in a slot which is adapted to receive a base portion of the rubbing strip segment.

It will be apparent to one skilled in the art that the ring segment 28, sealing strips 30, and rubbing strip 32 of FIG. 10 may be adapted to function in conjunction with other types of rotating members, such as the steam seal illustrated in cross section in FIGS. 8 and 9. Such adaptation requires the determination of the radius of the rotating member at each portion which will correspond to a rubbing strip segment or sealing strip segment, and selection of corresponding rubbing strip segments and sealing strip segments having internal radii which will provide proper clearances in accordance with the invention.

Figure 11:
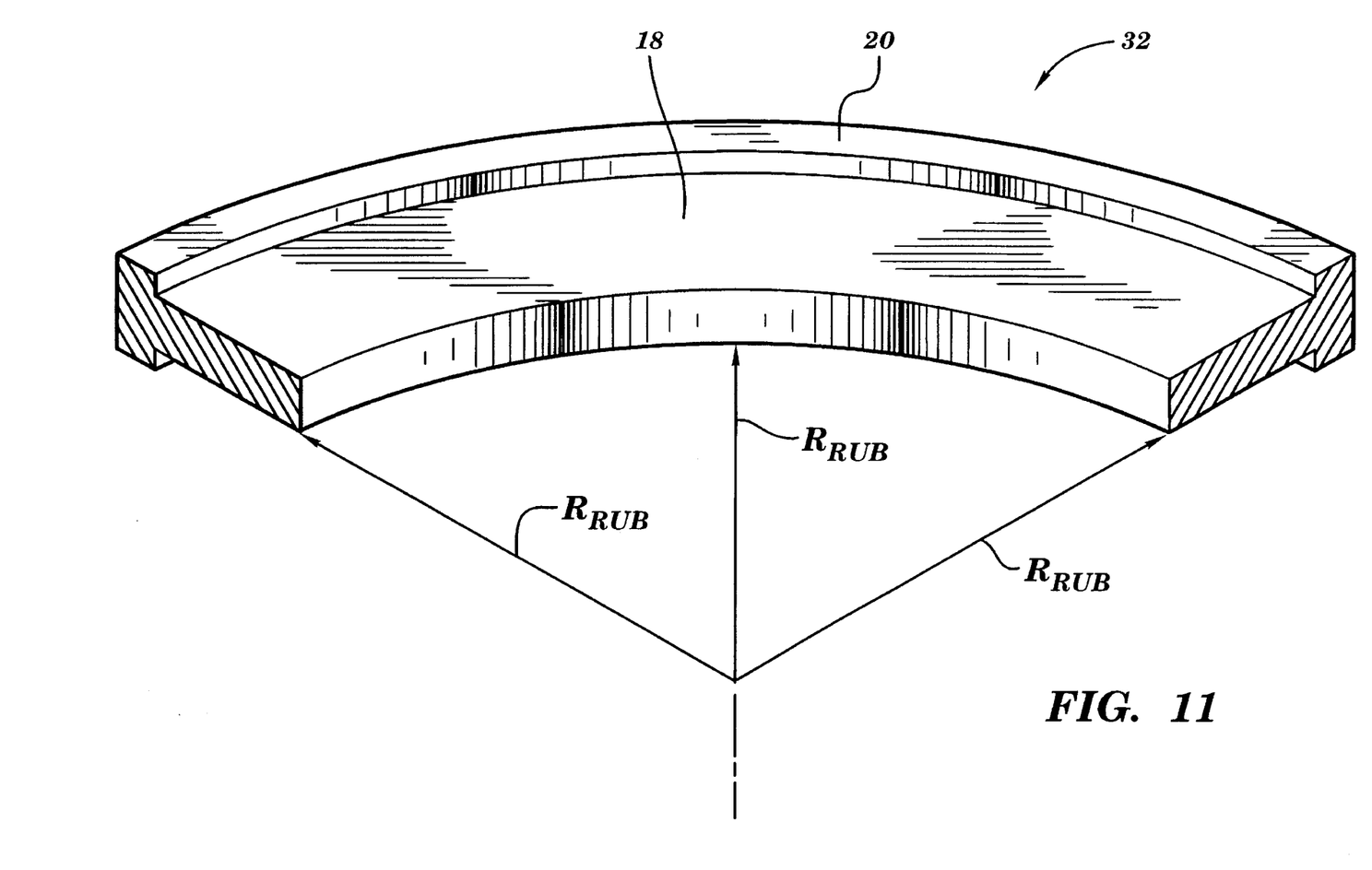
FIG. 11 depicts a rubbing strip segment in accordance with the invention.

FIG. 11 illustrates a rubbing strip segment 32 which may be employed in the ring segment of FIG. 10 where a slot for receiving the rubbing strip segment 32 is provided. The rubbing strip segment 32 comprises a strip portion 18 and a base portion 20. The strip portion 18 defines an interior radius $R_{RUB}$ which is selected to correspond to a portion of a rotating member such that a desired clearance is provided.

While the invention has been disclosed in connection with the embodiments depicted herein, it will be apparent to one of ordinary skill in the art that various modifications and substitutions may be made to these embodiments without departing in any way from the scope of the invention as defined in the following claims.

What is claimed is:

1. A seal for a turbine comprising:

ring means, supportable by a stationary member of said turbine, for encircling a rotating member of said turbine, at least one substantially circular sealing strip supported by said ring means and extending from said ring means toward an exterior surface of said rotating member, and a substantially circular rubbing strip supported by said ring means and extending from said ring means toward said exterior surface of said rotating member, said rubbing strip having a clearance with respect to said exterior surface of said rotating member which is less than the least of clearances of said at least one sealing strip with respect to said exterior surface of said rotating member, said rubbing strip being axially separated from each of said at least one sealing strips.

2. The seal of claim 1, wherein said sealing strip and said rubbing strip extend radially inward from said ring means toward said exterior surface of said rotating member.

3. The seal of claim 1, wherein said ring means is comprised of a plurality of ring segments, each of said ring segments supporting at least one sealing strip segment comprising a segment of said at least one sealing strip, and a rubbing strip segment comprising a segment of said rubbing strip.

4. The seal of claim 1, wherein said rubbing strip is composed of a material having a coefficient of friction which is less than that of steel.

5. The seal of claim 4, wherein said material is carbon.

6. The seal of claim 4, wherein said material is chromium steel.

7. The seal of claim 1, wherein said rubbing strip has a rectangular cross section.

8. The seal of claim 1, further comprising spring means for biasing said ring toward said rotating member, wherein said rubbing strip is substantially centered with respect to said spring means.

9. The seal of claim 2, wherein said at least one sealing strip comprises a plurality of sealing strips extending radially inward toward said exterior surface, said rubbing strip having a radial clearance with respect to said exterior surface which is less than the least of radial clearances of said plurality of sealing strips with respect to said exterior surface.

10. The seal of claim 1, comprising two rubbing strips disposed substantially at respective edges of said ring means.

11. The seal of claim 10, wherein said at least one sealing strip comprises a plurality of sealing strips extending radially inward toward said exterior surface, said two rubbing strips having respective radial clearances with respect to said exterior surface which are less than the least of radial clearances of said plurality of sealing strips with respect to said exterior surface.

12. A shaft end packing for a providing a seal about a rotor of a turbine, comprising:

packing head means for encircling said rotor and including receiving means for receiving one or more ring segments, and a plurality of ring segments mounted to said packing head means, said ring segments each comprising:
at least one sealing strip segment extending radially inward toward an exterior surface of said rotor, and
a rubbing strip segment extending radially inward toward said exterior surface of said rotor,
said rubbing strip segment having a radial clearance with respect to said exterior surface which is less than the least of radial clearances of said at least one sealing strip segment with respect to said exterior surface,
said rubbing strip segment being axially separated from each of said at least one sealing strip segments.

13. The packing of claim 12, wherein each ring segment further comprises spring means for biasing said ring segment radially inward.

14. The packing of claim 12, wherein said rubbing strip segment is composed of a material having a coefficient of friction which is less than that of steel.

15. The packing of claim 14, wherein said material is carbon.

16. The packing of claim 14, wherein said material is chromium steel.

17. The packing of claim 12, wherein said rubbing strip segment comprises a base portion and a strip portion, said strip portion having a rectangular cross section.

18. The packing of claim 13, wherein said ring segment comprises one rubbing strip segment which is substantially centered with respect to said spring means.

19. The packing of claim 18, wherein said ring segment comprises a plurality of sealing strip segments extending radially inward toward said exterior surface, said rubbing strip segment having a radial clearance with respect to said exterior surface which is less than the least of radial clearances of said plurality of sealing strip segments with respect to said exterior surface.

20. The packing of claim 12, wherein said ring segment comprises two rubbing strip segments disposed substantially at respective edges of said ring segment.

21. The packing of claim 20, wherein said ring segment comprises a plurality of sealing strip segments extending radially inward toward said exterior surface, said rubbing strip segment having a radial clearance with respect to said exterior surface which is less than the least of radial clearances of said plurality of sealing strip segments with respect to said exterior surface.

22. A ring segment for a shaft end packing for providing a seal about a rotating member of a turbine, said rotating member having an external surface, said packing ring segment comprising:

a base portion,

N sealing strip segments, where (N≧1), said sealing strip segments being coextensive with said base portion and extending radially inward from said base portion, each sealing strip segment having an interior radius $R_{Nseal}$, and each sealing strip segment corresponding to one of N portions of said rotating member, each of said portions of said rotating member having an external radius $R_{Nrotor}$, and a rubbing strip segment coextensive with said base portion and extending radially inward from said base portion, and having an internal radius $R_{RUB}$, said rubbing strip segment corresponding to a portion of said rotor having an external radius $R_{ROTOR}$, said rubbing strip segment having a radial clearance $(R_{RUB}-R_{ROTOR})$ which is less than the least of radial clearances $(R_{Nseal}-R_{Nrotor})$ of said N sealing strip segments, said rubbing strip segment being axially separated from each of said N sealing strip segments.

23. The ring segment of claim 22, further comprising biasing means attached to said ring segment.

24. The ring segment of claim 22, wherein said rubbing strip segment is composed of a material having a coefficient of friction which is less than that of steel.

25. The ring segment of claim 24, wherein said material is carbon.

26. The ring segment of claim 24, wherein said material is chromium steel.

27. The ring segment of claim 22, wherein said rubbing strip comprises a base portion and a strip portion, said strip portion having a rectangular cross section.

28. The ring segment of claim 23, wherein said ring segment comprises one rubbing strip segment which is substantially centered with respect to said biasing means.

29. The ring segment of claim 22, wherein said ring segment comprises M rubbing strip segments, where (M>1), each of said rubbing strip segments being coextensive with said base portion and extending radially inward from said base portion, each of said M rubbing strips having a corresponding internal radius $R_{Mrub}$, each of said rubbing strip segments corresponding to one of M portions of said rotor, each of said M portions of said rotor having an external radius $R_{Mrotor}$, each of said M rubbing strip segments having a radial clearance $(R_{Mrub}-R_{Mrotor})$ which is less than the least of said radial clearances $(R_{Nseal}-R_{Nrotor})$ of said N sealing strip segments.

30. A rubbing strip segment for use in a ring segment of a steam seal formed about a rotating member of a turbine in an axially separated orientation from all sealing strip segments of said ring segment, said ring segment including N sealing strip segments, where (N≧1), said sealing strip segments being coextensive with said ring segment and extending radially inward from said ring segment, each of said sealing strip segments having an interior radius $R_{Nseal}$, and each of said sealing strip segments corresponding to one of N portions of said rotating member, each of said portions of said rotating member having an external radius $R_{Nrotor}$, said rubbing strip segment comprising:

an arcuate member having a root portion and a rubbing portion integral with said root portion, said rubbing portion having an internal radius $R_{RUB}$, said rubbing portion corresponding to a portion of said rotating member, said portion of said rotating member having an external radius $R_{ROTOR}$, said rubbing strip segment providing a radial clearance $(R_{RUB}-R_{ROTOR})$ which is less than the least of respective radial clearances $(R_{Nseal}-R_{Nrotor})$ provided by said N sealing strips.

31. The rubbing strip segment of claim 30, composed of a material having a coefficient of friction which is less than that of steel.

32. The rubbing strip segment of claim 31, wherein said material is carbon.

33. The rubbing strip segment of claim 31, wherein said material is chromium steel.

34. The rubbing strip segment of claim 30, wherein said base portion and said rubbing portion of said rubbing strip segment form a T-shaped cross section.

* * * * *